United States Patent [19]
Frechet et al.

[11] Patent Number: 5,663,260
[45] Date of Patent: Sep. 2, 1997

[54] HYPERBRANCHED COPOLYMERS FROM AB MONOMERS AND C MONOMERS

[75] Inventors: Jean M.J. Frechet, Ithaca, N.Y.; Sadahito Aoshima, Chiba, Japan

[73] Assignee: Cornell Research Foundation, Inc., Ithaca, N.Y.

[21] Appl. No.: 335,935

[22] Filed: Nov. 8, 1994

[51] Int. Cl.⁶ ................................ C08G 61/12
[52] U.S. Cl. .............. 526/292.9; 526/293; 526/309; 526/313; 526/320; 526/259; 526/279; 526/332; 526/185; 526/204; 526/217; 526/221; 526/225; 526/237; 525/244; 525/248; 525/249; 525/267; 525/288; 525/302; 525/312; 424/DIG. 16
[58] Field of Search ................ 526/221, 226, 526/259, 293, 292.9, 279, 309, 313, 332, 320, 312; 424/DIG. 16; 568/596, 603; 548/444, 445; 525/267, 248, 249, 244, 288, 302

[56] References Cited

U.S. PATENT DOCUMENTS

| | | | |
|---|---|---|---|
| 4,581,429 | 4/1986 | Solomon et al. | 526/220 |
| 4,962,163 | 10/1990 | Hefner, Jr. et al. | 525/463 |
| 5,134,213 | 7/1992 | Kawaguchi | 526/242 |
| 5,196,491 | 3/1993 | Cho et al. | 526/185 |
| 5,214,105 | 5/1993 | Frechet | 525/245 |

OTHER PUBLICATIONS

D. Jungbauer et al. (1990) Appl. Phys. Lett 56, 2610–2612.

*Primary Examiner*—Mark Nagumo
*Attorney, Agent, or Firm*—Bruce F. Jacobs

[57] ABSTRACT

A process for preparing hyperbranched polymers from AB monomers and C monomers Using a self-constructing approach is disclosed along with the hyperbranched polymers of a living-like character produced by such process.

56 Claims, No Drawings

HYPERBRANCHED COPOLYMERS FROM AB MONOMERS AND C MONOMERS

BACKGROUND OF THE INVENTION

Structurally, polymers are classified as either linear or branched wherein the term "branched" generally means that the individual molecular units of the branches are discrete from the polymer backbone, yet may have the same chemical constitution as the polymer backbone. Thus, regularly reacting side groups which are inherent in the monomeric structure and are of different chemical constitution than the polymer backbone are not considered as "branches"; that is, for example, the methyl groups pendant on a polydimethylsiloxane chain or a pendant aryl group in a polystyrene are not considered to be branches of such polymers. All descriptions of branching and backbone in the present application are consistent with this meaning.

The simplest branched polymers are the comb branched polymers wherein a linear backbone bears one or more essentially linear pendant side chains. This simple form of branching, often called comb branching, may be regular wherein the branches are distributed in uniform fashion on the polymer backbone or irregular wherein the branches are distributed in non-uniform or random fashion on the polymer backbone. An example of regular comb branching is a comb branched polystyrene as described by T. Altores et al. in J. Polymer Sci., Part A, Vol. 3 4131–4151 (1965) and an example of irregular comb branching is illustrated by graft copolymers as described by Sorenson et Preparative Methods of Polymer Chemistry, 2nd Ed., Interscience Publishers, 213–214 (1968).

Another type of branching is exemplified by cross-linked or network polymers wherein the polymer chains are connected through the use of bi-functional compounds; e.g., polystyrene molecules bridged or cross-linked with divinylbenzene. In this type branching, many of the individual branches are not linear in that each branch may itself contain side chains pendant from a linear chain and it is not possible to differentiate between the backbone and the branches. More importantly, in network branching, each polymer macromolecule (backbone) is cross-linked at two or more sites to other polymer macromolecules. Also the chemical constitution of the cross-linkages may vary from that of the polymer macromolecules. In this cross-linked or network branched polymer, the various branches or cross-linkages may be structurally similar (called regular cross-linked) or they may be structurally dissimilar (called irregularly cross-linked). An example of regular cross-linked polymers is a ladder-type poly(phenylsisesquinone) [sic] {poly-(phenylsilsesquioxane)}. Sogah et al, in the background of U.S. Pat. No. 4,544,724, discusses some of these types of polymers and gives a short review of the many publications and disclosures regarding them. U.S. Pat. No. 4,435,548, discusses branched polyamidoamines; U.S. Pat. Nos. 4,507, 466, 4,558,120, 4,568,737, 4,587,329, 4,713,975, 4,871,779, and 4,631,337 discuss the preparation and use of dense star polymers, and U.S. Pat. Nos. 4,737,550 and 4,857,599 discuss bridged and other modified dense star polymers.

Other structural configurations of macromolecular materials that have been disclosed include star/comb-branched polymers, such disclosure being found in U.S. Pat. Nos. 4,599,400 and 4,690,985, and rod-shaped dendrimer polymers are disclosed in U.S. Pat. No. 4,694,064.

Hutchins et al, in U.S. Pat. Nos. 4,847,328 and 4,851,477, deal with hybrid acrylic-condensation star polymers and Joseph et al, in U.S. Pat. Nos. 4,857,615, 4,857,618, and 4,906,691, with condensed phase polymers having regularly, or irregularly, spaced polymeric branches essentially on the order of a comb structure macromolecules.

M. Gauthier et al, Macromolecules, 24, 4548–4553 (1991) discloses uniform highly branched polymers produced by stepwise anionic grafting. M. Suzuki et al, Macromolecules, 25, 7071–2 (1992) describes palladium-catalyzed ring-opening polymerization of cyclic carbamate to produce hyperbranched dendritic polyamines. Macromolecules, 24, 1435–1438 (1991) discloses combburst dendrimer topology derived from dendritic grafting. U.S. Pat. No. 5,041,516 discloses other dendritic macromolecules.

The various architectures of these macromolecules results in a variety of end product uses. It is desirable to produce macromolecules that are hyperbranched (containing 2 or more generations of branching) so as to enable the production of highly functional macromolecules. Increasing the functionality of a macromolecule at a multiplicity of sites within the macromolecule can make it a much more useful molecule.

Dendrimers and hyperbranched polymers have received much attention recently due to their unusual structural features and properties. In the early 1950's, Flory, J. Am. Chem. Soc., 74, 2718 (1952) discussed the potential of $AB_2$ monomers, in which A and B are different reactive groups which react with each other to form a chemical bond, for the formation of highly branched polymers. However, the formation of high molecular weight hyperbranched polymers from $AB_2$ monomers containing one group of type A and two of type B was not accomplished until 1988 when Kim et al., Polym. Prep., 29(2), 310 (1988) (U.S. Pat. No. 4,857,630) reported the preparation of hyperbranched polyphenylene.

Numerous other hyperbranched polymers have been reported since that time by Hawker et al., J. Am. Chem. Soc., 113, 4583, (1991); Uhrich et al, Macromolecules, 25, 4583 (1994); Turner et al, Macromolecules, 27, 1611 (1994); and others. See also U.S. Pat. Nos. 5,196,502; 5,225,522; and 5,214,122. All of these hyperbranched polymers are obtained by polycondensation processes involving $AB_2$ monomers. In general, these hyperbranched polymers have irregularly branched structures with high degrees of branching between 0.2 and 0.8.

The degree of branching DB of an $AB_2$ hyperbranched polymer has been defined by the equation DB=(1-f) in which f is the mole fraction of $AB_2$ monomer units in which only one of the two B groups has reacted with an A group.

In contrast to hyperbranched polymers, regular dendrimers are regularly branched, macromolecules with a branch point at each repeat unit. Unlike hyperbranched polymers that are obtained via a polymerization reaction, most regular dendrimers are obtained by a series of stepwise coupling and activation steps. Examples of dendrimers include the polyamidoamide (PAMAM) Starburst™ dendrimers of Tomalia et al, Polym. J., 17, 117 (1985) or the convergent dendrimers of Hawker et al, J. Am. Chem. Soc., 112, 7638 (1990).

Recently, some highly branched polymers have been prepared in multistep processes involving a graft on graft technique that leads to a dramatic increase in molecular weight as a result of successive stepwise grafting steps. Examples of such polymers are the Combburst™ polymers of Tomalia et al., Macromolecules, 24, 1435 (1991); U.S. Pat. No. 4,694,064; and the "arborescent" polymers of Gauthier et al., Macromolecules, 24, 4548 (1991) and Macromolecular Symposia, 77, 43 (1994).

The preparation of hyperbranched polymers by a chain growth vinyl polymerization has not been accomplished previously.

DISCLOSURE OF THE INVENTION

Accordingly, the present invention is directed to a process for preparing highly branched or "hyperbranched" polymers by a chain-growth polymerization process involving the copolymerization reaction of an AB monomer with a C monomer. The AB monomers that may be used contain two reactive groups A and B, which react independently of each other within a molecule, i.e., reaction onto A is not required to trigger the reaction of B. The A group is a polymerizable vinyl group that is able to react with an active moiety such as an anion, a cation, or a conventional initiating or propagating moiety of the type well known in the art of vinyl polymerization such as those described in Principles of Polymerization, 3rd Ed. by G. Odian (Wiley) to produce anew activated group A* that is capable of further reaction with any A-containing moiety present in the polymerization mixture to give an A'-A* unit in which A' is an inactive (non-reactive) group derived from A that acts as a building block of the final polymer.

The B group is preferably a reactive group that can be activated by an activator such as one or more external activator molecules like (i) alkyl aluminum halide, e.g. $EtAlCl_2$ and $Et_{1.5}AlCl_{1.5}$, (ii) $SnCl_4$; (iii) $SnCl_4$ combined with $Bu_4NCl$, (iv) HI combined with $I_2$, or (v) $CH_3SO_3H$ combined with $Bu_4NCl$ and $SnCl_4$ or $SnCl_4$ combined with 2,6-di-tert-butylpyridine. Other external activators include Lewis acids, bases such as hydroxides, butyl lithium, amines and carbanions, heat, light, or radiation, which activate to produce an anion, cation, or conventional initiating or propagating moiety well known in the art of vinyl polymerization such as those described in Aoshima et al, J. Polymer Science, A, Polymer Chemistry, 32, 1729 (1994) or in Ishihama et. al. Polymer Bulletin 24 201 (1990) or in Higashimura et. al. Macromolecules 26, 744 (1993) or in "Polymer Synthesis", 2nd Ed, by P. Rempp and E. Merrill (Hüthig & Wepf). Once activated, B becomes B*. Any B* group present in the polymerization mixture may react with any A-containing moiety present in the polymerization mixture to afford a B'-A* unit in which B' is an inactive group derived from B that acts as a building block of the final polymer.

The C monomer contains a polymerizable group that can be initiated by A*, B*, as well as by another suitable initiator such as alkyl aluminum halides, Lewis acids, bases, heat, light, and radiation. Once reaction of C with an A* or a B* unit or another initiator has occurred, C becomes a new activated C* group that is capable of further reaction with any A containing moiety present in the system, as well as with any C monomer remaining in the system. For example, further reaction of a moiety containing C* with an A containing moiety affords a new product with a C'-A, unit in which C' is an inactive (non-reactive) group derived from C that acts as a building block of the final polymer. Similarly, further reaction of a moiety containing C* with a C monomer unit affords a new product with a C'-C* unit in which C' is an inactive group derived from C that acts as a building block of the final polymer.

The reactive moiety of the C monomer, such as a vinyl ether group, may be exactly the same as the A moiety of the AB monomer which is presently the preferred embodiment, or it may be another type of vinyl group having a reactivity or polymerizability similar to that of A with respect to B* or A*.

This invention represents a new concept whereby hyperbranched polymers are obtained not from an $AB_2$ type monomer as described in the prior art, but from an AB monomer in combination with a C monomer. The process comprises "self-constructing" polymers that contain throughout their growth a single polymerizable group A and a multiplicity of propagating species such as A* or B*, for example, a carbenium ion.

In the process of the present invention, the "monomer" consists of polymerizable initiator molecules (AB molecules) that are activated by an external event to produce activated polymerizable initiator molecules (AB* molecules). Not all AB molecules need to be activated to A-B* since both A* and B* can add to any available A group, and any B group that remains inactivated may become activated later as a result of an exchange process. These molecules grow by adding to any available polymerizable A or C group present in the reaction mixture in a process that involves successive and repeated couplings of growing polymer chains with A-containing moieties and C-containing moieties, including the growing chains themselves, until the concentration of A and C groups is so reduced that the polymerization process no longer proceeds at an appreciable rate. Alternately, the polymerization of the C monomer may be started first followed by addition of the AB monomer to produce a hyperbranched polymer.

The process of the present invention leads to a growing chain and therefore a final polymer containing not only units derived from the AB monomer but also units derived from the C monomer. Compared to a process involving homopolymerization of only AB monomers, in the branched polymers produced by the process of this invention the distance between branches may be larger, at least on average, due to the incorporation of the linear units C' in the final branched polymer. The incorporation of units of C into the final polymer structure may provide for looser branching densities (a lower degree of branching) and/or for the introduction of desirable features in the final polymers through the functionalities or characteristics that are inherent to the C' building blocks.

According to the process of the present invention, both AB monomers and C monomers may be present together at the start of the polymerization or the polymerization may be started first from one or more AB monomers alone and an activator moiety (or external stimulus) while C is added later either in one addition or multiple additions, including a continuous or incremental addition over a defined period of time during the polymerization reaction. Alternately, the polymerization could be started using monomer C alone and a suitable initiator with a Lewis acid such as $EtAlCl_2$, a base such as hydroxide, butyl lithium, or a carbanion or by using radiation to produce C*, and then adding the AB monomer. Yet another alternative is to use both AB and C monomers and add an initiator obtained, for example, by the reaction of compounds containing the B reactive group alone; i.e. not part of an AB molecule, with an activator moiety such as a Lewis acid, a base, or an external stimulus.

According to one embodiment of the present invention, an A—A monomer is added during the polymerization, commonly in the later stages of polymerization, prior to its completion or quenching, to couple pre-formed molecules of hyperbranched polymer to increase the molecular weight of the final hyperbranched polymer. An A—A monomer is added in an amount and at a time such that precipitation of the polymer does not occur. Too much A—A may lead to undesirable crosslinking. If used, a suitable amount of A—A monomer is about 0.1 to 10 mole % of total monomer. As the amount of A—A increases, the reaction generally requires greater monitoring to terminate it prior to crosslinking or insolubilization. Suitable A—A monomers may be selected from any of divinyl ether, 1,1'-bis(2-vinyloxyethoxy)-4,4'-isopropylidene diphenol, diethyleneglycol divinylether, butanediol divinyl ether, cylohexanedimethanol divinylether, hexanediol divinyl ether, cyclohexanediol divinyl ether, poly(THF) divinyl ether, polyethyleneglycol divinyl ether, ethylene glycol divinyl ether, triethyleneglycol divinyl ether, tetraethyleneglycol divinyl ether, divinylbenzene, bis-(4-ethenylphenyl)methane, bis-1,2-(4-ethenylphenyl)ethane, ethyleneglycol dimethacrylate, bis-1,2-(4-ethenylphenoxy) ethane, or bis-1,4-(4-ethenylphenoxy) butane. Particularly preferred A—A monomers are di-vinyl ether and bis-ethenylbenzene.

Due to the balanced reactivities of AB, C, AB*, B*, A*, and C*, the composition of the polymerization mixture can be varied at will from a substantially AB homopolymer having only a few C monomer linear units to a copolymer containing almost exclusively C monomer units with only a few branching units resulting from the incorporation of some AB monomer. It is also possible to have systems in which more than one C monomer is used with an AB monomer or in which more than one AB monomer are used with one or more C monomers, provided of course that the reactivities of all the monomers are balanced or similar. For example, If the AB monomer is a vinyl ether then C will usually be a vinyl ether too and if AB is a styrene monomer then C will also be a styrene, although different families of polymers (e.g. vinyl ethers and styrenes) may be used if their reactivities are similar as described, for example, by Kojima et al. Polymer Bulletin 23,139 (1990) or in Macromolecules 24, 2658 (1991) or by Ohmura et al Macromolecules 27, 3714 (1994).

The "self-constructing" polymerization will generally not provide a degree of branching of 1.0, because of thermodynamic, kinetic, and steric factors that may prevent some sites from reacting regular fashion. Therefore, a hyperbranched polymer with a degree of branching below to 1.0, generally about 0.05–0.95, preferably above about 0.2, more preferably above about 0.3, still more preferably above about 0.5, will be obtained in all but ideal conditions, i.e. when there are absolutely no side reactions and growth follows a regular geometric pattern not affected by any steric or similar factor. The degree of branching of an AB hyperbranched polymer is defined as the mole fraction of AB monomer units located at branch points or chain ends. Since C functions similarly to a spacer group and its addition to an AB polymer leads to a looser structure with more space between AB units which are responsible for branching, it has no effect on the degree of branching.

The hyperbranched polymers of the present invention retain their living-like character in that once the polymerization stops and before quenching is carried out the final polymer still contains many active sites such as A*, B* and C, that could be polymerized further using AB, C, or AA monomers to produce larger hyperbranched structures or star-like polymers with hyperbranched cores or globular block polymers with linear arms. Moreover, the active sites A*, B*, and C* may be quenched to produce many functionalized chain ends. In cationic polymerizations, suitable quenching agents are generally nucleophiles such as methanol, water, the sodium salt of diethyl malonate, amines, halides, or substituted phenyl lithium. In the case of anionic polymerizations, suitable quenching agents are generally electrophiles such as aldehydes, ketones, substituted alkyl or benzyl halides, alcohols, or water. As a result, the hyperbranched polymers have and can be designed for numerous end uses many of which are not possible for other polymers.

The hyperbranched polymers are useful in the formulation of adhesives, carriers for drugs or biological materials, slow release formulations, crosslinking agents, paints, rheology modifiers, additives for coatings and plastics, inks, lubricants, foams, components of cosmetic formulations, hairspray, deodorents and the like, components of separation media, porosity control agents, complexing and chelating agents, carriers for chiral resolution agents, components of medical imaging systems, carriers for gene transfection, and resist or imaging materials.

DETAILED DESCRIPTION OF THE PREFERRED EMBODIMENT(S)

An example of the process of the present invention whereby a hyperbranched polymer is prepared from the AB monomer in combination with a C monomer is described in Reaction Scheme 1:

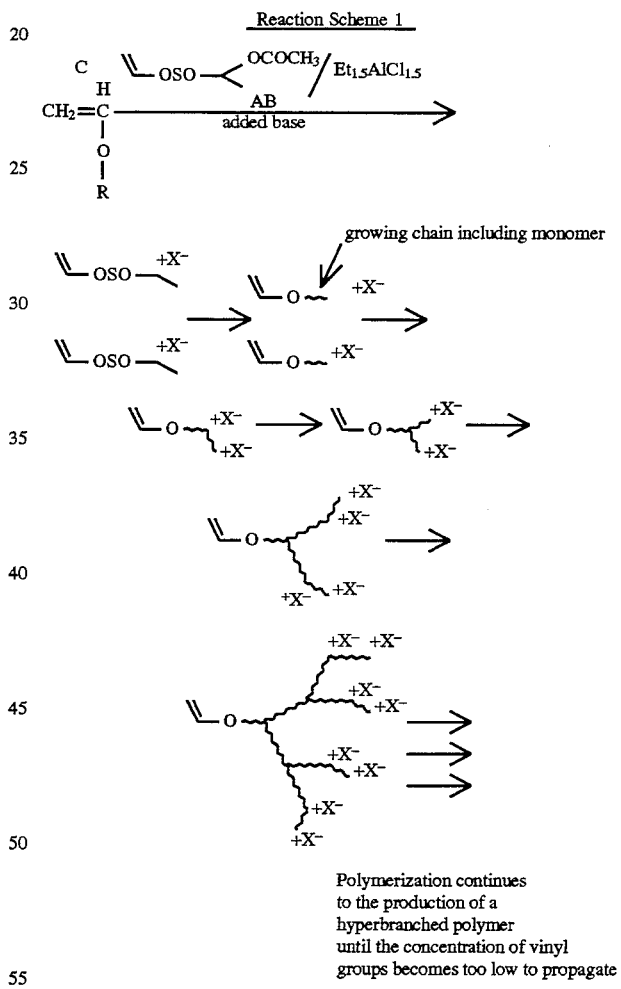

Polymerization continues to the production of a hyperbranched polymer until the concentration of vinyl groups becomes too low to propagate As shown in Reaction scheme 1, a vinyl ether AB monomer (labeled AB) and a Lewis acid activator are added to a different vinyl ether (labeled C) to afford a growing initiated moiety that can continue to grow by successive additions of either or both A containing moieties and C monomer units. Each addition to an A containing moiety results in an increase in the number of active growing centers contained on a single chain, therefore the resulting polymer becomes highly branched. Reaction Scheme 1 is a very general and simplified overview of the process of the invention since it is difficult to represent all of the different growth pathways. The AB monomer is shown to contain a group Sx which is a spacer group separating the "A" end of the monomer from the B end. This spacer group may be of varying length and is constituted of building blocks that are unreactive with A, B, C, A*, B,, C*. Therefore, the Sx group does not participate directly in the polymerization process but it may contribute to the properties of the final polymer (density, refractive index, thermal, mechanical, optical properties, etc.).

The order of addition of AB and C can be varied and the initiation will typically occur upon addition of an activator such as ethyl aluminum sesquichloride as shown. As described previously, it is possible to achieve a similar objective by adding a classical living-type polymerization initiator such as 1-acetoxyethylbenzene, or 4-acetoxypentane or 1-phenoxy-2-(1-acetoxyethyloxy) ethane or (1-acetoxyethyloxy)ethane that contains the 1-acetoxyethyl group found in B plus an activator to the mixture of monomers AB and C (or to C, then adding AB, and the like). Other initiating systems such as those described by Aoshima et al., J. Polymer Science, A, Polymer chemistry 32, 1729 (1994) and references therein are also suitable.

As is well known in the art, the cationic polymerization of vinyl ethers requires that special conditions be maintained to ensure that undesirable side-reactions such as crosslinking, chain transfer or termination are avoided. The use of such standard precautions as described for example in the review by M. Sawamoto, Prog. Polym. Sci., 1991, 16, 111–172 is preferred. For example, polymerization is generally carried out in the absence of water and in the presence of slightly basic agents such as ethers or esters that help stabilize the "living" chain ends (propagating groups). Conditions must also be maintained to prevent elimination reactions. Suitable conditions are well known in the art and include the absence of water, selection and strength of the Lewis acid and of the complex formed between the Lewis acid and the carbocationic center, the addition of a "basic" or "nucleophilic" additive such as dioxane, tetrahydrofuran, ethylacetate, or 2,6-di-t-butyl pyridine to stabilize the carbocationic propagating center, and the like. For an anionic process, suitable conditions include the use of a dry solvent such as tetrahydrofuran or cyclohexane and the absence of water or electrophilic impurities such as aldehydes, ketones, benzylic or aliphatic halides. The use of additives such as glymes or cyclic ethers including tetrahydrofuran or dioxane, or tetramethyl ethylenediamine (TMEDA), or hexamethyl phosphoramide (HMPA) or crown ethers and cryptants that help stabilize the propagating center is also well known in the art. (See, for example, P. Rempp and E. Merrill in "Polymer Synthesis" 2nd Edition, chapter 5, (Hüthig & Wepf).

To simplify the representation in Reaction Scheme 1, it is assumed that all AB molecules are transformed into AB, molecules at the start of the process. This is not a requirement because both A* and B* can react with any molecule containing a reactive A and/or a reactive C group.

Once the polymerization is complete, the remaining activated A*, B*, and C* sites can be terminated by addition of a suitable reagent. In the case of the cationic polymerization shown in Reaction Scheme 1, this reagent could be a nucleophile like methanol, water, amine, halide ion, or the sodium salt of diethyl malonate, or a substituted phenyl lithium. In the case of anionic polymerizations, suitable reagents are generally electrophiles such as aldehydes, ketones, substituted alkyl or benzyl halides, alcohols, or water. The same would also apply to a group transfer polymerization that involve electrophiles as terminating agents. For example, styrene AB and C monomers polymerized cationically would be terminated by reaction with nucleophilic reagents, while styrene monomers polymerized anionically would be terminated by electrophilic reagents. Vinyl ether AB and C monomers would be polymerized cationically and therefore they would be terminated with nucleophilic reagents. Acrylic monomers AB and C polymerized by group transfer polymerization would be terminated using electrophilic reagents.

In Reaction Scheme 1, the active chain-ends or propagating sites (A* and B* groups) are shown by a "+" sign indicating their cationic nature. The counterions represented by an "X" and a "−" sign may be any suitable counterion such as $Et_{1.5} AlCl_{1.5}$ (OAc), $C_2H_5AlCl_2OAc$, $I_2Ac$ or $I_3^-$.

Reaction Scheme 2 shows the structure of a typical growing chain that is applicable in the case where the polymerization is initiated by the preferred process of the addition of an activator; e.g., Lewis acid, base or external stimulus such as heat or light, to monomers AB and C. Because a vinyl ether is depicted the activator is a Lewis acid.

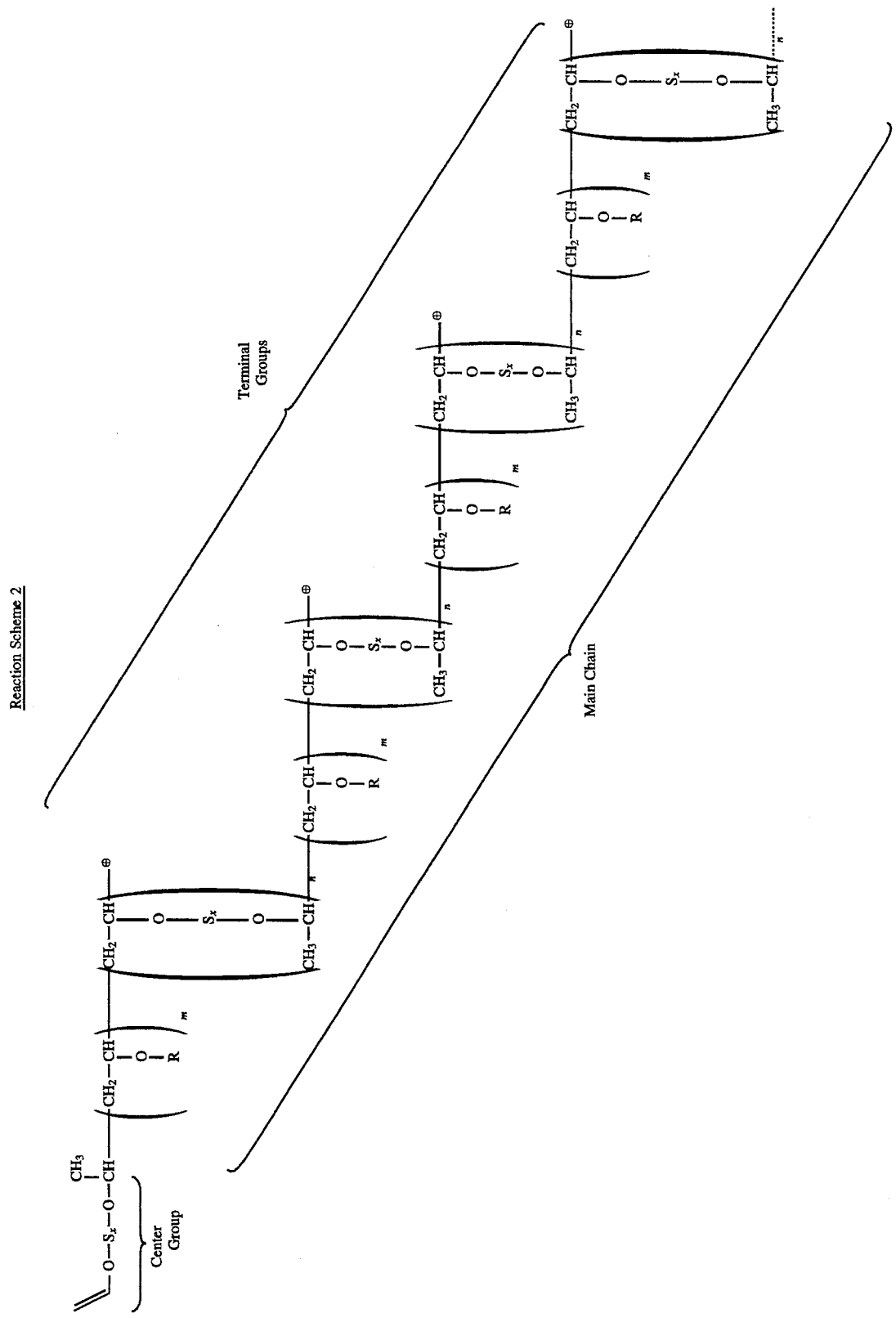
Reaction Scheme 2

As shown, a characteristic of these chains is the presence of one reactive vinyl group per growing chain (top left of Reaction Scheme 2, labeled as "center group") as well as many cationic centers (shown by a + sign). Reaction Scheme 3 below is also oversimplified as growth is shown with an alternation of monomer units AB and C in the main-chain of the copolymer. In all but ideal situations, the chain would grow in more random fashion; growth being affected by the nature of the two monomers, their relative reactivities and concentrations, etc.

In the special case of initiation using a classical living-like polymerization initiator; e.g. B-like initiator plus an activator, the growing chains may or may not look like the structure shown in Reaction Scheme 2, because it is possible to have "center groups" derived from the initiator molecule itself and therefore without a vinyl group.

Reaction Scheme 3 shows a final polymer corresponding to the growing chains of Reaction Scheme 2 after termination of growth by addition of methanol as described in greater detail in the Examples. Other reagents such as water, the sodium salt of diethyl malonate, substituted phenyl lithium, or other nucleophiles may also be used to effect termination.

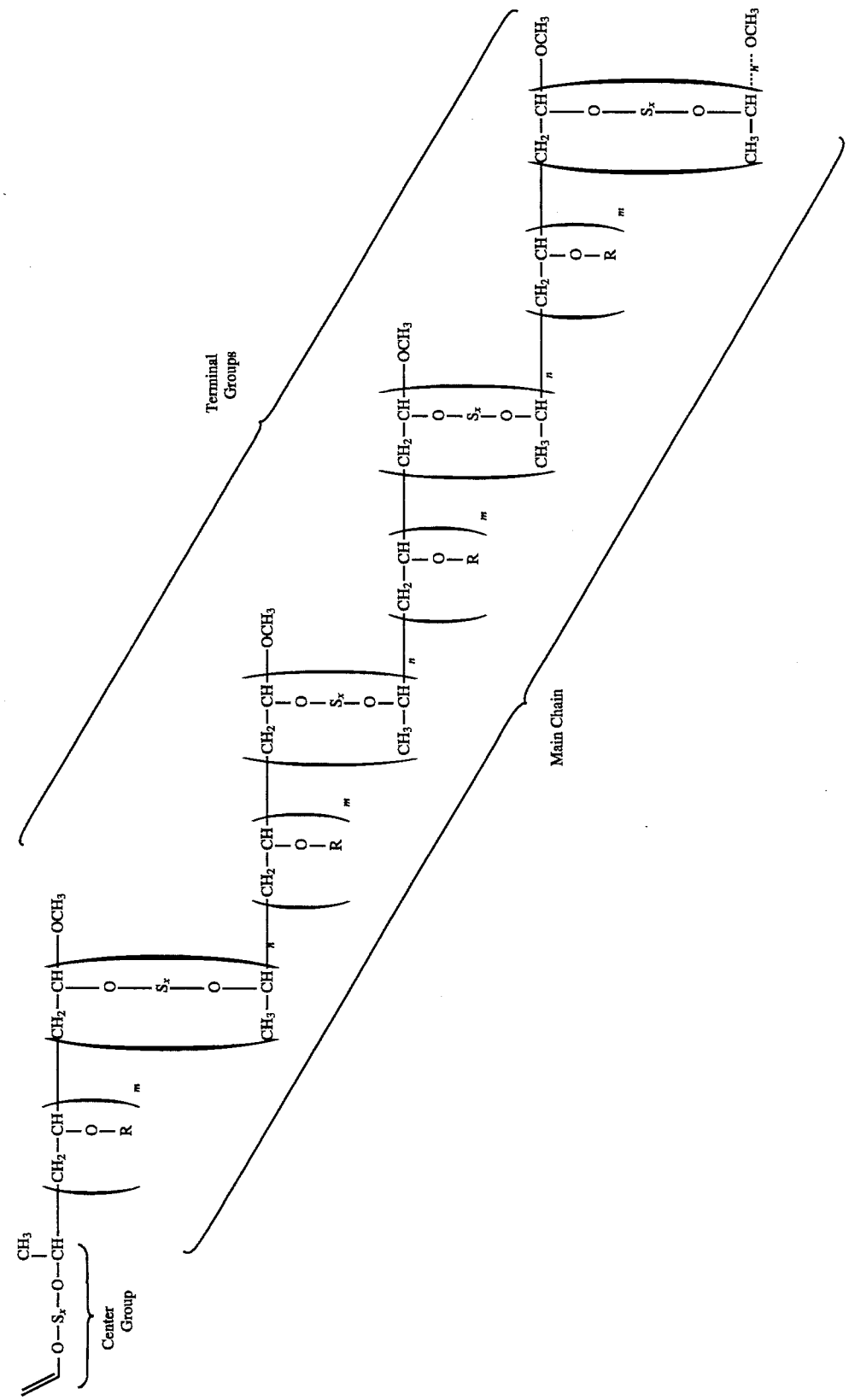

In this fashion, a hyperbranched polymer containing numerous reactive groups at its chain ends is obtained.

The specific shape (globular, globular-linear blocks, star, loose highly branched chains, etc.) of the copolymers obtained in accordance with this invention is primarily controlled by the following six factors:

(1) ratio of AB to C monomers;

(2) relative reactivities of A and C towards activated species A*, B* and C*;

(3) thermodynamic and steric factors;

(4) method of addition of AB or C monomers;

(5) eventual addition of an additional initiator molecule (such as a B moieties alone; not coupled with A);

(6) combinations involving more than one AB and C monomer such as two different AB monomers and one C monomer, or two different AB monomers and two C monomers, etc.

In addition to the versatility of functionalities allowed by the AB structures themselves, the use of a C monomer allows the introduction of additional functional groups throughout the highly functionalized polymer. Therefore, the nature and reactivity of the main chain of the highly branched macromolecule can be controlled through the choice of C. For example, C may carry a pendant group that does not participate in the polymerization but is available for subsequent reactions involving the finished highly branched polymer; e.g. pendant acrylic group, masked amine, masked alcohol or protected carboxylic group. It must be emphasized that this versatility is in addition to that provided through the control of chain ends and other groups included in the A-B units and the choice of the termination reaction. The nature and amount of C used in the copolymerization can affect the final properties of the hyperbranched copolymers. For example, C may change the physical and mechanical properties such as viscosity or modulus of the final hyperbranched copolymer.

AB molecules useful in the present invention are best represented by the formula $A\text{-}(Sx)_p\text{-}B$ in which A and B are as defined above, Sx is a spacer group separating A from B and p is an integer of 0, 1 or 2. In the specific compositions shown below a bond is shown on A and B to show the point of attachment of either to the other or to Sx. The term AB monomer as used herein means $A\text{-}(S)_p\text{-}B$. In this formula when p is 2, there may two of the same Sx groups or the two Sx groups may be different. Moreover, according to this definition, Sx need not be present in any of the monomers. A spacer group S changes the distance between branch points and may be used to contribute to the final polymer properties such as resistance to oil, elongation, rigidity, shape, thermal or optical properties or the like or it may be used to introduce reactive pendant groups such as pendant acrylic group, masked amine, masked alcohol or protected carboxylic groups. Any such pendant group must be inert to the polymerization reaction used to prepare the hyperbranched polymer. Only certain A, B and S groups are compatible with each other. Only certain C monomers may be used with certain AB monomers. Thus, they are described in compatible groups hereinafter.

While any A, B, C and Sx groups may be used, they must be compatible with each other. The compatibility of A, B, C and Sx groups is related to the reactivity of A, B, C, Sx, A, B, and C*. Compatible groups are those for which the reactivity of A*, B* and C* with an A group will be substantially similar such that the polymerization may proceed through any of A*, B* or C* alone. The compatibility of the Sx group with A B and C relate to its inability to react chemically with A, B, C, A* or B* or C* moieties for example to cause the formation of a new active propagating center through processes such as addition, chain transfer, or elimination reaction. Non-compatible groups may lead to side reactions such as chain transfer, inhibition, elimination or termination that may prevent growth of the hyperbranched polymer.

Since certain A, B, and Sx groups may not be compatible with each other, preferred such groups are specified below by compatible groups.

The first AB monomer grouping is represented by the formula $A^1(S^1)_pB^1$ wherein $A^1$ is selected from any of

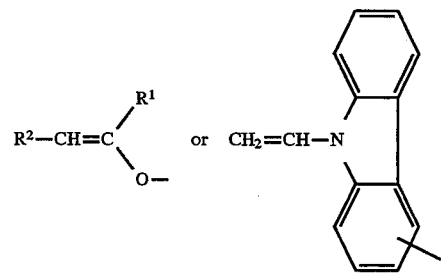

wherein $R^1$ is selected from any of H or $C_1$–$C_4$ alkyl, preferably H; and $R^2$ is selected from any of H and $C_1$–$C_4$ alkyl, preferably H.

A suitable companion $B^1$ group for the $A^1$ groups is represented by the general formula:

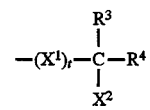

$R^3$ is selected from any of $C_1$–$C_4$ alkyl, dilphenyl, aryl such as phenyl or naphthyl, optionally substituted with one or more substituent such as halo, cyano, $C_1$–$C_4$ alkyl, and $C_1$–$C_4$ alkoxy. Preferably, $R^3$ is $C_1$–$C_4$ alkyl, most preferably methyl. $R^4$ is selected from any of H or $C_1$–$C_4$ alkyl. More preferably $R^4$ is H. $X^1$ is O. "t" is 0 or 1. $X^2$ is $OR^5$, $OCOR^5$, or halo, preferably chloro. $R^5$ is $C_1$–$C_4$ alkyl, haloalkyl, aryl, or aralkyl, more preferably methyl.

A suitable $S_x^1$ group which may be used with the above described companion $A^1$ and $B^1$ groups may be selected from any of $C_2$–$C_{12}$ alkylene, substituted $C_2$–$C_{12}$ alkylene wherein the substituents are selected from $C_1$–$C_4$ alkyl or aralkyl wherein the alkyl is $C_1$–$C_4$;

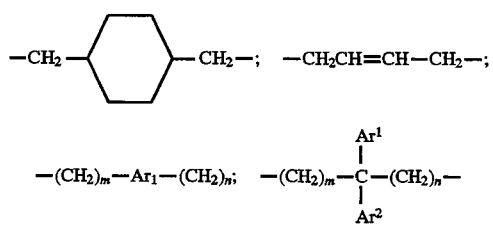

wherein m and n are the same or different and are each integers from 0 to about 18, $Ar^1$ and $Ar^2$ are the same or different and are aryl selected from phenyl, naphthyl, biphenyl, optionally substituted with one or more substituents selected from $C_1$–$C_4$ alkyl, $C_1$–$C_4$ alkoxy, halo, or acetoxy;

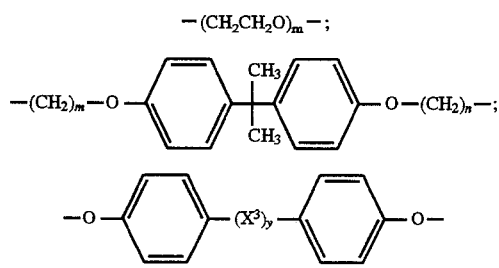

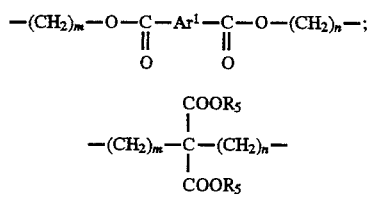

wherein y=0 or 1, and $X^3$ is selected from any of O, S, $SO_2$, $CH_2$ or CO;

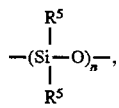

wherein $R^5$ is $C_{1-4}$ alkyl or aryl;

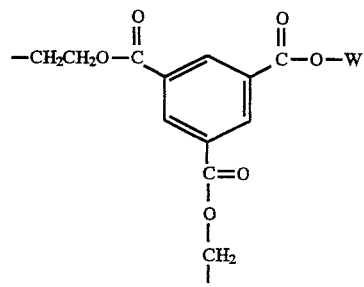

polystyrene, polyisobutylene, polyester, polyether, polyolefin, polyetherketone, polycarbonate, polysulfone; or

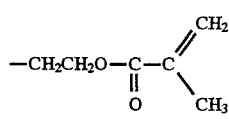

wherein W is

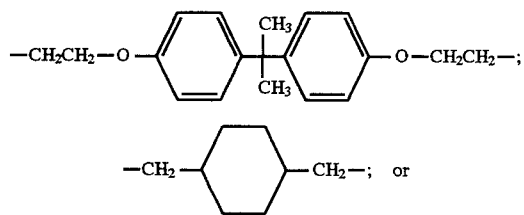

More preferably, $S_x^1$ selected from any of

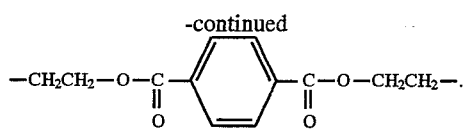

Suitable C monomers which may be reacted with the preceding $A^1(S_x^1)_pB^1$ monomer is $C^1$, represented by the general formula:

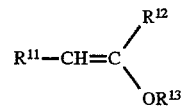

$R^{11}$ is selected from any of H or $C_1$–$C_6$ alkyl, more preferably methyl or H and most preferably H; $R^{12}$ is selected from any of H or $C_1$–$C_6$ alkyl, more preferably methyl or H and most preferably H; $R^{13}$ is selected from any of $C_1$–$C_{18}$ alkyl, $C_1$–$C_{18}$ haloalkyl, aralkyl, $$-(CH_2CH_2O)_n-R^{14}, \quad -CH_2CH_2OCOR^{15}, \quad -(CH_2)-COOR^{16},$$

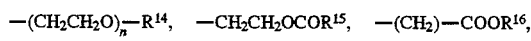

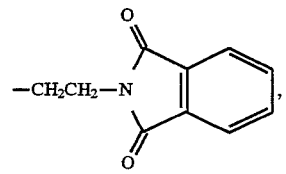

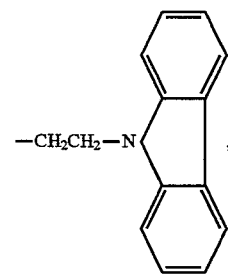

—Si—$(R^{16})_3$, and —$CH_2CH_2OSi(R^{16})_3$. $R^{14}$ is $C_1$–$C_{18}$ alkyl, $C_1$–$C_{18}$ haloalkyl, aralkyl, or

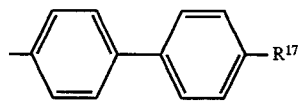

wherein $R^{17}$ is $OCH_3$ or CN. $R^{15}$ is $C_1$–$C_{18}$ alkyl, $C_1$–$C_{18}$, haloalkyl, aralkyl,

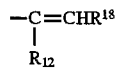

wherein $R^{18}$ is H, phenyl or —CH=CH—$CH_3$. $R^{16}$ is $C_1$–$C_{18}$ alkyl or aryl.

Alternatively, the A, B and Sx groups in an AB monomer may be represented by the formula $A^2(S_x^1)B^2$ wherein $A^2$ is selected from

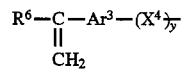

wherein $R^6$ is H or $C_1$–$C_4$ alkyl, preferably H; $Ar^3$ is aryl or N-alkyl-3-carbazoyl wherein the alkyl is $C_1$–$C_4$, preferably phenyl; $(X^4)_y$ is O or $CH_2$, preferably $X^4$ is O attached to a phenyl $Ar^3$ at the para position; and y is 0 or 1.

A suitable Compatible $B^2$ group is:

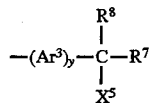

$R^7$ is selected from any of H, $CH_3$, $C_1$–$C_8$ alkyl or aryl, preferably H. $R^8$ is H or $C_1$–$C_8$ alkyl, preferably methyl. $X^5$ is halo, $OR^9$, or $OCH_2OCO$–$R^9$ wherein $R^9$ is selected from any of $C_1$–$C_8$ alkyl, $C_1$–$C_8$ haloalkyl or aryl; preferably $X^5$ is chloro.

$B^2$ may also be selected from

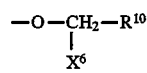

$R^{10}$ is selected from any of $C_1$–$C_8$ alkyl or aryl, preferably methyl. $X^6$ is halo such as chloro, bromo, iodo, etc., preferably chloro.

A suitable C monomer which may be used with the immediately preceding $A^2(S_x^1)B^2$ monomer is $C^1$ as previously defined herein or and most preferably $C^2$ selected from any of

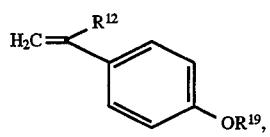

wherein $R^{19}$ is selected from any of $C_1$–$C_8$ alkyl, aralkyl or —COO-alkyl ($C_1$–$C_8$);

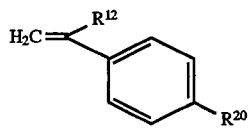

wherein $R^{20}$ is selected from any of H or $C_1$–$C_{12}$ alkyl; or

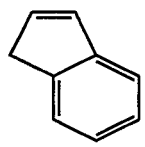

Alternatively, the A, B and $S_x$ groups in an AB monomer may be represented by the formula $A^3(S_x^2)B^3$ wherein $A^3$ is selected from any of

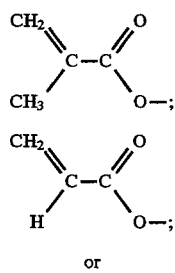

or

-continued

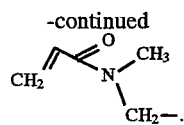

A suitable $B^3$ group is

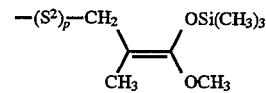

wherein $S_x^2$ is $C_1$–$C_8$ alkyl, aryl, substituted aryl, aralkyl substituted aralkyl or —$(CH_2$—$CH_2$—O—$)_r$, wherein r is 1–18 and wherein the substituents are selected from any of F, $OCH_3$, or $C_1$–$C_{12}$ alkyl.

The C monomer which may be used with the preceding $A^3(S_x^2)B^3$ monomer, $C^3$, may be selected from any of

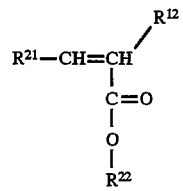

wherein $R^{21}$ is H or $CH_3$ and $R^{22}$ is $C_1$–$C_{18}$ alkyl, aryl or aralkyl;

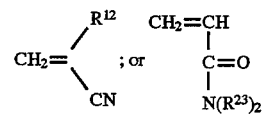

wherein $R^{23}$ is $C_1$–$C_{18}$ alkyl.

Alternatively, the A, B, and Sx groups in an AB monomer may be such that the AB monomer is selected from any of

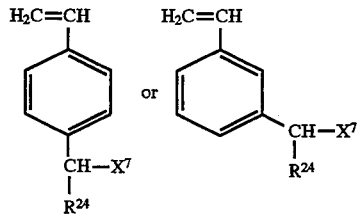

wherein $X^7$ is halo, preferably chloro or bromo, and $R^{24}$ is H or $C_1$–$C_6$ alkyl, preferably $CH_3$.

The C monomer used with the preceding AB monomers is a styrene of the formula:

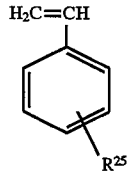

wherein $R^{25}$ is in the 3 or 4 position and is selected from H, alkyl $C_1$–$C_6$, —O-alkyl ($C_1$–$C_6$), —OCO-alkyl ($C_1$–$C_6$), and —O—Si-trialkyl ($C_1C_6$); preferably H or alkyl $C_1$–$C_4$; more preferably H or $CH_3$.

Particularly suitable AB monomers include: 1-(2-vinyloxyethyl- oxy)-1'-[2-(1-acetoxyethoxy)-ethyloxy]

bisphenol; 1-vinyloxymethyl-4-(1-acetoxy) ethyloxymethylcyclohexane; 1-(2-vinyloxyethyl)-4-[1-acetoxyethyloxy)ethyl]terephthalate; 2-(2-vinyloxyethyl)-2-[(1-acetoxyethyloxy)ethyl]diethyl malonate; 1-(2-vinyloxyethyl)-3-[(1-acetoxyethyloxy)ethyl]-5-(2-methacryloxyethyl)-1,3,5-benzene tricarboxylate; 1-[(4-ethenyl)-phenoxymethyl]-4-[4-(1-chloroethyl) phenoxymethyl]benzene; 4(2-(1-chloroethyloxy)) ethyloxystyrene; 4-(1-bromoethyl)styrene; 4-(1-chloroethyl)styrene; chloromethylstyrene; 3-(1-bromoethyl) styrene; and 3-(1-chloroethyl)styrene.

Particularly suitable C monomers include 2-methoxyethyl vinyl ether, 2-(trimethylsilyloxy)ethyl vinyl ether, isobutyl vinyl ether, 2-methoxyethyl vinyl ether, 2-butoxyethyl vinyl ether, ethyl vinyl ether, methyl vinyl ether, butyl vinyl ether, cyclohexylmethyl vinyl ether, [4-(methoxymethyl) cyclohexyl]methyl vinyl ether, 2-(trimethylsilyloxy)ethyl vinyl ether, 2-(t-butyldimethylsilyloxy)ethyl vinyl ether, t-amyl vinyl ether, triethyleneglycol methyl vinyl ether, 2-ethylhexyl vinyl ether, cylohexylvlnyl ether, 4-(trimethylsilyloxy)butyl vinyl ether, [4-(trimethylsilyloxymethyl)cyclohexyl]methyl vinyl ether, 4-methoxystyrene, 4-methylstyrene, 4-acetoxystyrene, 4-t-butyldimethylsilyloxystyrene, 4-trimethylsilyloxystyrene, 4-(2-methoxyethoxy)styrene, methylmethacrylate, ethyl methacrylate, butyl methacrylate, phenyl methacrylate, methyl acrylate, ethyl acrylate, butyl acryiate, phenyl acrylate, N,N-dimethyl methacrylamide, N,N-dimethylacrylamide, N-vinylcarbazole.

As used herein, unless otherwise noted alkyl and alkoxy, whether used alone or as part of a substituent group, include straight and branched chains. For example, alkyl radicals include methyl, ethyl, propyl, isopropyl, n-butyl, isobutyl, sec-butyl, t-butyl, n-pentyl, 3-(2-methyl)butyl, 2-pentyl, 2-methylbutyl, neopentyl, n-hexyl, 2-hexyl and 2-methylpentyl. Alkoxy radicals are oxygen ethers formed from the previously described straight or branched chain alkyl groups.

The term "aryl" as used herein alone or in combination with other terms indicates aromatic hydrocarbon groups such as phenyl or naphthyl. The term "aralkyl" means an alkyl group substituted with an aryl group.

While certain currently preferred substituents are identified above, these are not intended in any manner to limit the substituents which may be present on the various AB and C compounds, provided that they do not interfere in the primary polymerization reactions.

EXAMPLES

In the Examples, the following abbreviations have the meanings recited: DMSO=Dimethyl sulfoxide; THF= Tetrahydrofuran; CEVE=2-Chloroethyl vinyl ether; TLC= Thin layer chromatography; Et=ethyl and SEC=Size-exclusion chromatography; Bu=butyl; Ac=acetyl.

Example I

Preparation of Vinyl Ether-Type A-B Molecule (1) 1-(2-vinyloxy-ethyloxy)-1'-[2-(1-acetoxyethoxy)-ethyloxy]-4,4'-isopropylidene diphenol

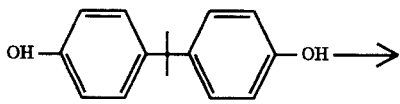

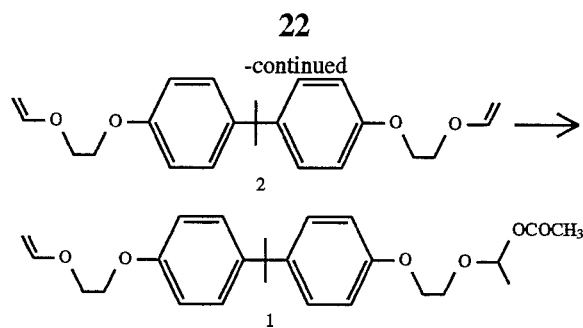

A mixture of bisphenol A (23 g), powdered NaOH (12 g), and DMSO (45 ml) were heated at 70°–75° C. with stirring under nitrogen for 1.5 hours. To the mixture, CEVE (39 g) was added slowly over 2 hours. An additional 20 ml of DMSO was added to this viscous mixture. Then the solution was heated for another 5 hours at 70°–75° C., and was allowed to stand overnight at room temperature. The reaction mixture was washed with water, and the isolated crude products purified by crystallizing twice from ethanol. The aromatic bisvinyl ether (2) was obtained as a white-pale yellow solid in 75% yield.

The preparation of acetic acid-adduct of the bisvinyl ether of bisphenol was carried out as follows. To the solution of bisvinyl ether 2 (7.4 g) in toluene (15 ml), was added a slight excess of glacial acetic acid (1.4 g). The mixture was heated at 70° C. under nitrogen for 8 hours. After cooling the mixture was evaporated to remove toluene and unreacted acetic acid. The yellowish oil was obtained almost quantitatively (>95%). TLC showed that the crude products contained three major materials: unreacted 2, mono-adduct of acetic acid to 2 (1), and di-adduct of acetic acid.

The mono-adduct of acetic acid to 2 (vinyl ether 1), an A-B type molecule, was separated from the mixture by flash chromatography eluting with hexane/diethyl ether (60/40); the Rf values of three fractions are 0.56, 0.31, 0.14, respectively. The eluent was them removed on a rotary evaporator and vacuum dried for 1 hour. A colorless transparent oil was obtained (43% yield based on 2).

Cationic copolymerization of Isobutylvinyl ether (IBVE) with 1 as an A-B Molecule The purified 1 and isobutyl vinyl ether were dissolved in the mixture of dry ethyl acetate and hexane, and, the solution was allowed to stand overnight over granular $CaH_2$, to remove trace amounts of water. The transparent supernatant fraction was then transferred to the reaction vessel and used to prepare the monomer solution. Polymerization was carried out under dry nitrogen in a baked glass vessel equipped with a three-way stopcock. The reaction was initiated by addition of $E_{1.5}AlCl_{1.5}$ in toluene used as an activator to the solution containing IBVE, 1 and ethyl acetate in hexane at 0° C. ($[IBVE]_0$=0.76 mol/l, $[1]_0$=$[Et_{1.5}AlCl_{1.5}]_0$=0.15 mol/l, $[ethyl\ acetate]_0$=2.0 mol/l; total scale of the reaction: 5 ml). Ethyl acetate was used as an added base to stabilize the propagating carbocations by its nucleophilic interaction and prevent the occurrence of various side reactions such as crosslinking, chain transfer reaction etc. After 30 min, the reaction was quenched by 2 ml of 0.3 wt % ammonia in methanol. The quenched reaction mixture was diluted with hexane and then washed with dilute hydrochloric acid (0.6 mol/l) and water to remove the initiator residues. After neutralization, the polymer product was recovered by evaporation of the solvents under reduced pressure, and vacuum dried overnight. The colorless polymer is isolated quantitatively as a viscous liquid. The polymer is completely soluble in hexane, toluene, THF, ethyl acetate, chloroform. The molecular weight measured by SEC with polystyrene standard (THF, 40° C.) was MW=$2 \times 10^4$. The molecular weight distribution curve showed a clear shoulder extending to $5 \times 10^5$. The structure of the polymer is confirmed by NMR and IR.

Example II

Preparation of Hyperbranched Poly(1) with Higher Molecular Weight

The polymerization was carried out as above with addition of small amount of 2 (A—A type molecule, 0.01 mol/l) after 30 min followed by quenching. The work up process was similar to that in Example I. The polymer was obtained in 88% yield. The polymer is completely soluble in THF, ethyl acetate, chloroform. SEC measurement with the resulting polymer shows that Mw exceeds 100,000 as measured with polystyrene standards.

Example III

Preparation of Vinyl Ether-Type A-B Molecule (3) 4-vinyloxymethyl-4-(1-acetoxy]ethyloxymethylcyclohexane

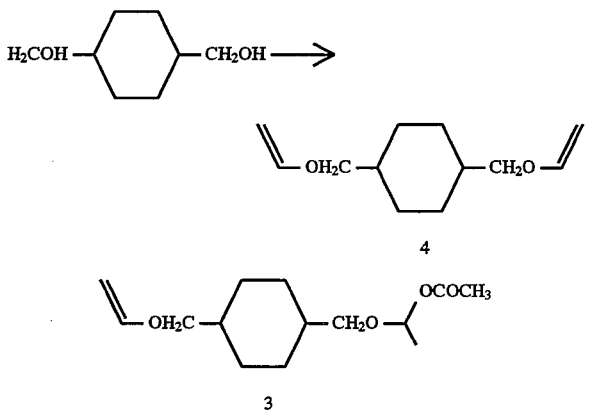

Vinyl ether-type A-B molecule 3 was prepared by the following two steps that include the synthesis of bisvinyl ether 4 by vinyl transetherification and the reaction with acetic acid. To a solution of distilled ethyl vinyl ether (29 ml, 0.3 mol), 1,4-cyclohexyl dimethanol (11 g, 0.075 mol), and 1,4-dioxane (15 ml) were added mercury(II) acetate (0.75 g, 0.0024 mol) as a catalyst and molecular sieves 4A (20 g) as an adsorbent of ethanol. The reaction was carried out at room temperature for 5 hours with occasional shaking. The reaction was then stopped by adding 2 g of anhydrous potassium carbonate. The reaction mixture was washed with water, dried over $Na_2SO_4$, and fractionated by flash chromatography eluting with hexane/diethyl ether (50/50)(yield ~20%).

The reaction of 4 (5.2 g) with acetic acid (1.9 g) was carried out at 70° C. under nitrogen. After 4 hours, the reaction mixture was allowed to cool, and evaporated to remove unreacted acetic acid. A colorless oil was obtained. The mono-adduct of acetic acid to 4, an A-B type molecule (3), was separated from the mixture by flash chromatography eluting with hexane/diethyl ether (80/20). The eluent was removed on a rotary evaporator and vacuum dried for 1 hour. The product was obtained as a colorless transparent oil (40% yield based on 4).

Cationic Copolymerization of IBVE with 3 as an A-B Type Molecule

Purified 3 and IBVE were dissolved in the mixture of dry ethyl acetate and hexane, and the solution was allowed to stand overnight over granular $CaH_2$ to remove trace amounts of water. The transparent supernatant fraction was transferred to the reaction vessel and used to prepare the monomer solution. The polymerization process was similar to that of compound 1 of Example I except for the use of $EtAlCl_2$ as the activator instead of $Et_{1.5}AlCl_{1.5}$. The reaction was initiated by addition of $EtAlCl_2$ in hexane to the solution containing IBVE, 3 and ethyl acetate in hexane at 0° C. ([IBVE]$_0$=0.76 mol/l, [3]$_0$=0.15 mol/l, [$EtAlCl_2$]$_0$=0.16 mol/l, [ethyl acetate]$_0$=4.0 mol/l; total scale of the reaction: 5 ml). Ethyl acetate was used as an added base to stabilize the propagating carbocations by its nucleophilic interaction and prevent the occurrence of various side reactions such as crosslinking, chain transfer, etc. The polymerization reaction progressed homogeneously. After 30 min, the reaction was quenched by 2 ml of 0.3 wt % ammonia in methanol. Work up was as described for compound 1 (see Example I). The polymer was obtained in 89% yield as a viscous liquid. The polymer was completely soluble in hexane, toluene, THF, ethyl acetate, and chloroform. The molecular weight measured by SEC with polystyrene standard (THF, 40° C.) was MW=$10^4$. The molecular weight distribution curve showed a shoulder extending to $10^5$. The structure of the polymer is confirmed by NMR and IR.

Example IV

Preparation of Highly Branched Copolymer of IBVE and 1 with Different Lengths of Branches Purified 1 was dissolved in the mixture of dry ethyl acetate and hexane, and the solution was allowed to stand overnight over granular $CaH_2$ to remove trace amounts of water. The copolymerization with IBVE and following work up processes were similar to those for compound 1 (see Example I) except for the different ratios of [IBVE]$_0$/[I]$_0$ that were used varying from 1:1 to 500:1. In all cases evaporation of the copolymerized mixture after quenching and work-up gave yields of copolymer exceeding 85%. Each of the copolymers was found to be completely soluble in hexane, toluene, THF, ethyl acetate, and chloroform. The polymer was characterized as described in Examples I and III.

Example V

Preparation of Highly Branched Copolymer of 2-Methoxyethyl Vinyl Ether and 1

Purified 1 was dissolved in the mixture of dry ethyl acetate and toluene, and the solution was allowed to stand overnight over granular $CaH_2$ to remove trace amounts of water. The copolymerization and following work up processes were similar to those for compound 1 and IBVE (see Example I) except for the difference of the added monomer: 2-methoxyethyl vinyl ether instead of IBVE ([2-methoxyethyl vinyl ether]$_0$=0.76 mol/l) and solvent, toluene. The polymer was obtained in 92% yield. The polymer is completely soluble in toluene, THF, ethyl acetate, and chloroform. The polymer was characterized as described in Examples I and III. Furthermore, the polymer solution in water exhibits the characteristic of thermally-induced phase separation.

Example VI

Preparation of Highly Branched Amphiphilic Block Copolymer

Purified 1 was dissolved in the mixture of dry ethyl acetate and hexane, and the solution was allowed to stand overnight over granular $CaH_2$ to remove trace amounts of water. The copolymerization of 1 with IBVE was carried out as described in example 1 until 95–100% conversion of the IBVE monomer at which point a fresh feed of 2-(trimethylsilyloxy)ethyl vinyl ether was added ([2-(trimethylsilyloxy)ethyl vinyl ether]$_0$=0.5 mol/l). The polymer was obtained in 95% yield. The quenched reaction mixture was diluted with ethyl acetate and then washed with dilute hydrochloric acid (0.6 mol/l) and water to remove the initiator residues. During this washing procedure or during the further treatment with a catalytic amount of methanolic HCl for less than 5 min at room temperature, quantitative desilylation of the polymer occurred, to give a block containing alcohol units. After neutralization and washing the polymer product was recovered by evaporation of the solvents under reduced pressure, and vacuum dried overnight. The colorless polymer is isolated essentially quantitatively as a viscous liquid. The polymer is soluble in THF, ethyl acetate, and chloroform. The highly branched polymer containing a hydrophobic poly(IBVE) unit and a hydrophilic poly(2-hydroxyethyl vinyl ether) unit was characterized as described in Examples I and III.

Example VII

Terpolymerization of IBVE with Two Different A-B Type Molecules

The terpolymerization of IBVE with two different A-B type molecules of comparable reactivities was carried out similarly to Examples I and III. Purified 1 and 3 were dissolved in a mixture of dry ethyl acetate and hexane, and the solution was allowed to stand overnight over granular $CaH_2$ to remove trace amounts of water. The transparent supernatant fraction was transferred to the reaction vessel and used to prepare the monomer solution. The polymerization process was similar to those for compounds 1 or 3 (see Example I or III). The reaction was initiated by addition of $EtAlCl_2$ in hexane to the solution containing IBVE, 1 and 3, and ethyl acetate, in hexane at 0° C. ([IBVE]$_0$=0.76 mol/l, [EtAlCl$_2$]$_0$=[1]$_0$+[3]$_0$=0.15 mol/l, [ethyl acetate[$_0$=2.0 mol/l; total scale of the reaction: 5 ml). Ethyl acetate was used as an added base to stabilize the propagating carbocations by its nucleophilic interaction and prevent the occurrence of various side reactions such as crosslinking, chain transfer, etc. After 30 min, the reaction was quenched by 2 ml of 0.3 wt % ammonia in methanol. Work up was as described for compound 1 (see Example I). The polymer was obtained in 96% yield as a viscous liquid. The polymer was completely soluble in hexane, toluene, THF, ethyl acetate, and chloroform. The polymer was characterized as described in Examples I and III.

Example VIII

Preparation of Tree-Like Polymers

Preparation of tree-like polymers was carried out similarly to Example I. On the first step, the living polymer of IBVE with a narrow molecular weight distribution (Mn= 1.6×10$^4$, Mw/Mn=1.06) was obtained by the living cationic polymerization with $(CH_3CHO)$ iso$C_4H_9$)OCOCH$_3$ (B)/ EtAlCl$_2$ in the presence of ethyl acetate at 0° C. ([IBVE]$_0$=0.76 mol/l, [5]$_0$=4 mmol/l, [EtAlCl$_2$]$_0$=20 mmol/l; conversion: 75%; total scale of the reaction: 5 ml). To the reaction mixture, compound 1 and extra IBVE were added ([1]$_0$=16 mmol/l, [IBVE]$_0$=1.0 mol/l), followed by quenching and work up as described in Example I. The resulting tree-like polymer with a linear block attached to a globular highly branched block has Mn=5×10$^4$ which is close to the calculated value. The polymer was completely soluble in hexane, toluene, THF, ethyl acetate, and chloroform. The polymer was characterized as described in Examples I and III.

As starting polymers, the highly branched polymer obtained in the Example I or III are also available, instead of the living poly(IBVE) to give more highly branched polymers with higher molecular weight (MW>10$^5$). A second portion of IBVE may also be added to the tree-like polymer to extend and increase the branches.

Example IX

Chemical Modification of Terminal Groups in the Polymer

As shown in Reaction Scheme 3, this type of highly branched polymer has a large number of useful terminal groups. As one example, chemical modification of the terminal groups was carried out by using a polymer with acetal terminal groups in Reaction Scheme 3 obtained under the conditions of Example I. The polymer was dissolved in dioxane, and then allowed to react with 1N HCl aqueous solution at room temperature, followed by neutralization. The quantitative conversion to aldehyde is confirmed by NMR.

Example X

Copolymerization of 4-(1-chloroethyl) styrene with 4-methlstyrene

A freshly dried glass apparatus was used for this polymerization under nitrogen atmosphere. A solution of 4-(1-chloroethyl)styrene (1.0 g, 6 mmoles) and 4-methylstyrene ((0.72 g, 6 mmoles) in dichloromethane (6 ml) was cooled to −15° C. then pre-cooled SnCl$_4$ (3 mmoles) dissolved in dichloromethane was added under nitrogen. A color change was observed upon mixing and the color increased as the temperature was allowed to rise to 0° C. After 8 hours of reaction with occasional stirring under inert atmosphere, the polymerization was quenched by addition of pre-chilled methanol (10 ml) containing a trace of ammonia. The color was discharged and the mixture diluted with dichloromethane then washed with 2% aqueous HCl and distilled water (5 times). The organic layer was concentrated and the copolymer (83% yield) isolated by precipitation from THF into methanol. After reprecipitation into hexanes its peak molecular weight measured by standard GPC with polystyrene standards was 70,000. The structure of the polymer was further confirmed by NMR in CDCl$_3$ and by infrared spectroscopic analysis.

Example XI

Copolymerization of 4-(1-chloroethyl) styrene with vinyltoluene

The copolymerization of the mixture of monomers (10 mmoles of each in a total of 10 ml dichloromethane) was accomplished as described in Example X except using inverse addition of the prechilled monomer solution to a solution containing SnCl$_4$ (5 mmoles) and tetrabutylammonium chloride (2.0 mmole) in dichloromethane cooled to −30° C. Once the addition was complete, the mixture was brought slowly from −30° C. to 0° C. with occasional mixing until the polymerization was quenched after 12 hours as described above. The highly branched copolymer was processed and characterized as described above in Example X.

What is claimed is:

1. A process for the preparation of a hyperbranched polymer comprising initiating polymerization of and thereafter copolymerizing a solution comprising an AB monomer and a C monomer, each of which is individually polymerizable, to produce growing chains in which A and B are reactive groups that react independently of each other in which A contains a group polymerizable in living fashion, C is a monomer that contains a group polymerizable in living fashion, B is a precursor of an activated B* species capable of effecting the living polymerization of A and C as a result of being activated, wherein B is activated and B* adds to any A or C polymerizable group and wherein each of A, B and C are compatible with each other.

2. The process of claim 1, wherein the polymerization is carried out so that the polymer contains throughout its growth polymerizable groups A and a multiplicity of active species A*, B*, and C, species that can add to any A or C polymerizable groups.

3. The process of claim 1 wherein the polymerization is carried out so that during polymer growth at least one of the growing chains contains a polymerizable group A while the polymerization mixture also contains a multiplicity of active A*, B*, and C* species that can add to any A or C polymerizable groups.

4. The process of claim 1 wherein the polymerization is carried out so that during polymer growth at least one of the growing chains contains a polymerizable group A and at least one active A* or B* species that can add to any A or C polymerizable groups, while all other growing chains contain active groups selected from A*, B*, and C* species, and multiple combinations thereof that can add to any A or C polymerizable groups.

5. The process of claim 1, wherein the AB and C monomers are present together at the initiation of polymerization.

6. The process of claim 5, wherein initiation is accomplished by the addition of an initiator obtained from the reaction of a compound containing a B-type reactive group, other than an AB monomer, with an activator moiety or external activation.

7. The process of claim 1, wherein the AB monomer is present at the initiation of polymerization and the C monomer is added thereafter.

8. The process of claim 1, wherein the C monomer is present at the initiation polymerization and the AB monomer is added thereafter.

9. The process of claim 8, wherein polymerization of the C monomer is initiated by the addition of a cationic initiator or an anionic initiator.

10. The process of claim 1, wherein activation of group B is accomplished by the addition of at least one activator molecule to the AB monomer solution.

11. The process of claim 10, wherein the activator molecule is a Lewis acid.

12. The process of claim 10, wherein the Lewis acid is an alkyl aluminum halide.

13. The process of claim 11, wherein the Lewis acid is selected from the group consisting of $SnCl_4$, $SnCl_4$ combined with $Bu_4NCl$, HI combined with $I_2$, $I_2$, $CH_3SO_3H$ combined with $Bu_4NCl$ and $SnCl_4$, and $SnCl_4$ combined with 2,6-di-tert-butylpyridine.

14. The process of claim 1, wherein activation of group B is accomplished by applying heat to the AB monomer solution.

15. The process of claim 1 wherein activation of group B is accomplished by applying light to the AB monomer solution.

16. The process of claim 1, wherein the AB monomer is represented by the general formula $A^1(Sx^1)_pB^1$ wherein p is 0, 1 or 2; wherein $A^1$ is selected from the group consisting of

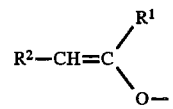

and

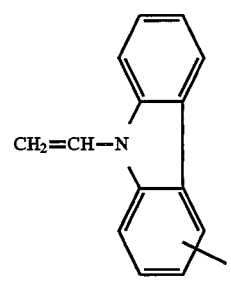

wherein $R^1$ is selected from the group consisting of H and $C_1$–$C_8$ alkyl, and $R^2$ is selected from the group consisting of H, $C_1$–$C_8$ alkyl; wherein $B^1$ is represented by the general formula:

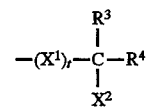

wherein $R^3$ is selected from the group consisting of $C_1$–$C_8$ alkyl, aryl, and substituted aryl; $R^4$ is selected from the group consisting of H and $C_1$–$C_8$ alkyl; $X^1$ is 0; t is 0 or 1; $X^2$ is selected from the group consisting of —$OR^5$, —$OCOR^5$, and halo; and $R^5$ is selected from the groups consisting of $C_1$–$C_8$ alkyl, $C_1$–$C_8$ haloalkyl, aryl, and aralkyl wherein the alkyl group is $C_1$–$C_4$, wherein $Sx^1$ is selected from the group consisting of $C_2$–$C_{12}$ alkylene, substituted $C_2$–$C_{12}$ alkylene wherein the substituents are selected from the group consisting of $C_1$–$C_4$ alkyl, or aralkyl wherein the alkyl group is $C_1$–$C_4$,

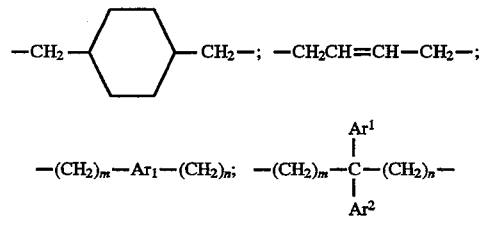

wherein m and n are the same or different and are integers from 0 to 18; $Ar^1$ and $Ar^2$ are the same or different and are selected from the group consisting of aryl, biphenyl, and substituted aryl, wherein the substituents are selected from the group consisting of $C_{1-4}$ alkyl, $C_1$–$C_4$ alkoxy, halo, and acetoxy;

-continued

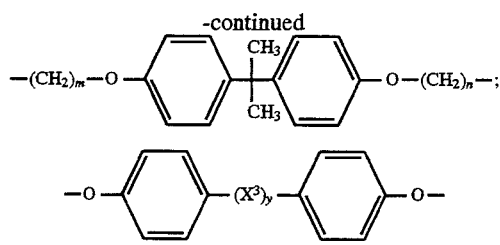

wherein y=0 or 1, and $X^3$ is selected from the group consisting of O, S, $SO_2$, $CH_2$, and CO;

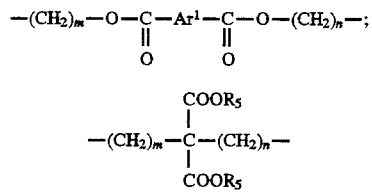

wherein $R^5$ is selected from the group consisting of $C_1$–$C_4$ alkyl and aryl;

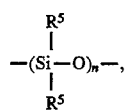

polystyrene, polyisobutylene, polyester, polyether, polyolefin, polyetherketone, polycarbonate, polysulfone; and

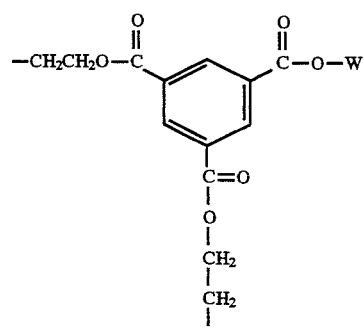

wherein W is

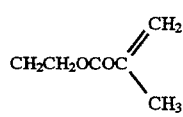

and wherein the C monomer is selected from the group consisting of

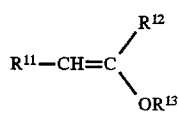

wherein $R^{11}$ is selected from the group consisting of H and $C_1$–$C_6$ alkyl; $R^{12}$ is selected from the group consisting of H and $C_1$–$C_6$ alkyl; $R^{13}$ is selected from the group consisting of $C_1$–$C_{18}$ alkyl, $C_1$–$C_{18}$ haloalkyl, aralkyl,

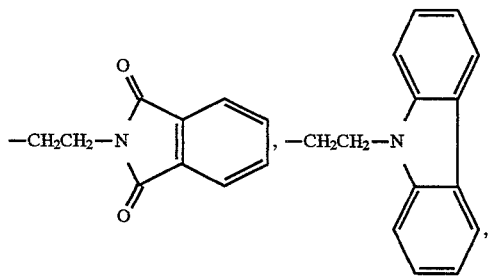

—Si$(R^{16})_3$, and —$CH_2CH_2O$—Si—$(R^{16})$ wherein $R^{14}$ is selected from the group consisting of $C_1$–$C_{18}$ alkyl, $C_1$–$C_{18}$ haloalkyl, aralkyl, and

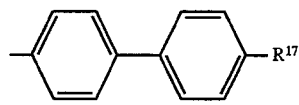

wherein $R^{17}$ is selected from the group consisting of $OCH_3$ and CN; $R^{15}$ is selected from the group consisting of $C_1$–$C_{18}$ alkyl, $C_1$–$C_{18}$ haloalkyl, aralkyl,

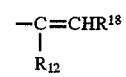

wherein $R^{18}$ is selected from the group consisting of H, phenyl and —CH=CH—$CH_3$; and $R^{16}$ is selected from the group consisting of $C_1$–$C_{18}$ alkyl and aryl.

17. The process of claim 16, wherein $R^1$ is H; $R^2$ is H; $B^1$ is represented by the general formula:

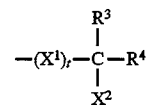

wherein $R^3$ is $C_1$–$C_4$ alkyl; $R^4$ is H; $X^1$ is 0; t is 0 or 1; and $X^2$ is halo.

18. The process of claim 16 wherein $S_x^1$ is selected from the group consisting of:

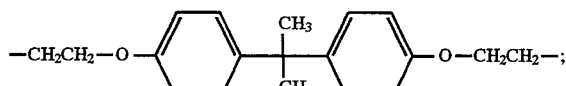

and

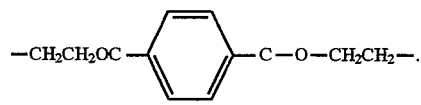

19. The process of claim 16, wherein $R^{11}$ is H and $R^{12}$ is H.

20. The process of claim 1, wherein the AB monomer is represented by the general formula $A^2(S_x^1)_p B^2$ wherein p is 0, 1, or 2; wherein $A^2$ is selected from the group consisting of:

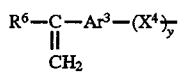

wherein $R^6$ is selected from the group consisting of H and $C_1$–$C_4$ alkyl; $Ar^3$ is selected from the group consisting of aryl and N-alkyl-3-carbazoyl wherein the alkyl is $C_1$–$C_8$; $X^4$ is selected from the group consisting of O and $CH_2$; and y is 0 or 1; and wherein $B^2$ is selected from the group consisting of

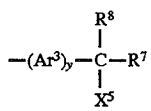

wherein $R^7$ is selected from the group consisting of H, $C_1$–$C_8$ alkyl, and aryl; $R^8$ is selected from the group consisting of H and $C_1$–$C_8$ alkyl; $X^5$ is selected from the group consisting of halo, O—$R^9$, and $OCH_3OCO$-$R^9$] $OCH_2OCO$-$R^9$ wherein $R^9$ is selected from the group consisting of $C_1$–$C_8$ alkyl, $C_1$–$C_8$ haloalkyl and aryl; and

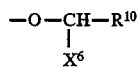

wherein $R^{10}$ is selected from the group consisting of $C_1$–$C_8$ alkyl and aryl; and $X^6$ is halo; and wherein $Sx^1$ is selected from the group consisting of $C_2$–$C_{12}$ alkylene, substituted $C_2$–$C_{12}$ alkylene wherein the substituents are selected from the group consisting of $C_1$–$C_4$ alkyl, and aralkyl wherein the alkyl group is $C_1$–$C_4$,

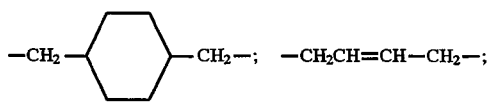

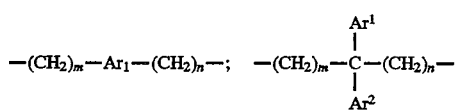

wherein m and n are the same or different and are integers from 0 to 18; $Ar^1$ and $Ar^2$ are the same or different and are selected from the group consisting of aryl, and substituted aryl, wherein the substituents are selected from the group consisting of $C_1$–$C_4$ alkyl, $C_1$–$C_4$ alkoxy, halo, and acetoxy

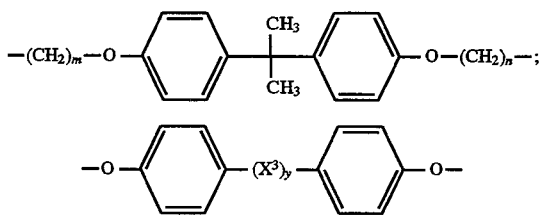

wherein y=0 or 1, and $X^3$ is selected from the group consisting of O, S, $SO_2$, $CH_2$, and CO;

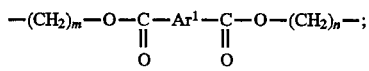

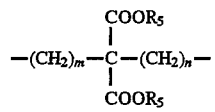

wherein $R^5$ is selected from the group consisting of $C_1$–$C_4$ alkyl and aryl;

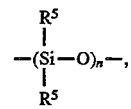

polystyrene, polyisobutylene, polyester, polyether, polyolefin, polyetherketone, polycarbonate, polysulfone; and

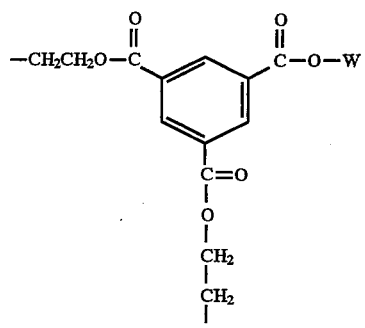

wherein W is

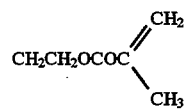

and the C monomer is selected from the group consisting of

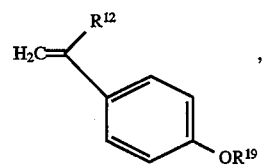

wherein $R^{19}$ is selected from the group consisting of $C_1$–$C_{18}$ alkyl, aralkyl, and —COO-alkyl ($C_1$–$C_8$);

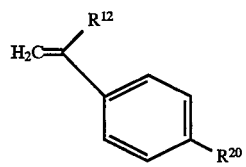

wherein $R^{20}$ is selected from the group consisting of H or $C_1$–$C_{12}$ alkyl; and

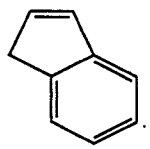

21. The process of claim 20, wherein $R^6$ is H; $Ar^3$ is phenyl; $(X^4)_y$ is O attached to a phenyl $Ar^3$ at the para position; y is 0 or 1; and when $B^2$ is

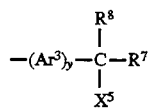

$R^7$ is H; $R^8$ is methyl; $X^5$ is chloro; and when $B^2$ is

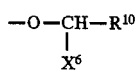

$R^{10}$ is methyl; and $X^6$ is chloro.

22. The process of claim 1, wherein the AB monomer is represented by the general formula $A^3(S_x^2)_p B^3$ wherein p is 0, 1, or 2; wherein $A^3$ is selected from the group consisting of

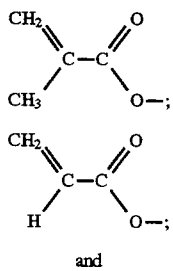

wherein $B^3$ is

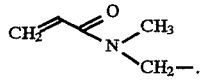

wherein $Sx^2$ is selected from the group consisting of $C_1$–$C_8$ alkyl, aryl, substituted aryl and —$(CH_2$—$CH_2$—O—$)_r$, wherein r is 1–18;

wherein the C monomer, $C^3$, is

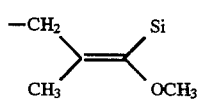

wherein $R^{21}$ is selected from the group consisting of H and $CH_3$ and $R^{22}$ is selected from the group consisting of $C_1$–$C_{18}$ alkyl, aryl and aralkyl;

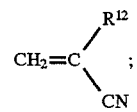

and

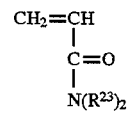

and wherein each $R^{23}$ is $C_1$–$C_{18}$ alkyl.

23. The process of claim 1, wherein the AB monomer is selected from the group consisting of

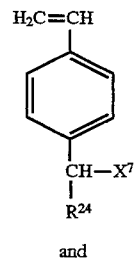

wherein $X^7$ is halo and $R^{24}$ is selected from the group consisting of H and $C_1$–$C_6$ alkyl; and the C monomer is a styrene of the formula:

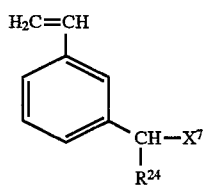

wherein $R^{25}$ is in the 3 or 4 position and is selected from H, alkyl $C_1$–$C_6$, —O—alkyl ($C_1$–$C_6$), —OCO-alkyl ($C_1$–$C_6$), and —O—Si-trialkyl ($C_1$–$C_6$); preferably H or alkyl $C_1$–$C_4$.

24. The process of claim 23, wherein $X^7$ is selected from the group consisting of chloro and bromo, $R^{24}$ is $CH_3$; and $R^{25}$ is selected from the group consisting of H or $CH_3$.

25. The process of claim 1, wherein A is a vinyl group.

26. The process of claim 1, wherein A is a vinyl ether group and C contains a different vinyl ether group.

27. The process of claim 1, wherein A is a vinyl ether group and C is a vinylcarbazoyl monomer.

28. The process of claim 1, wherein C is a vinyl ether group and A is a vinylcarbazoyl group.

29. The process of claim 1, wherein A is a styrene group and C is a styrene monomer different from A.

30. The process of claim 1, wherein A is a vinyl ether group and C is a styrene monomer.

31. The process of claim 1, wherein A is a styrene group and C is a vinyl ether monomer.

32. The process of claim 1, wherein A is a styrene group and C is a vinylcarbazoyl monomer.

33. The process of claim 1, wherein C is a styrene monomer and A is a vinylcarbazoyl group.

34. The process of claim 1, wherein when A is a vinyl ether group C is is a vinyl carbazoyl monomer and when A is a vinyl carbazoyl group, C is a vinyl ether monomer.

35. The process of claim 1, wherein A is a vinylcarbazoyl group and C is a vinylcarbazoyl monomer without a B group.

36. The process of claim 1, wherein A is a methacrylate or an acrylate group and B is a silylketene acetal group.

37. The process of claim 1, wherein the polymer is quenched with a reagent which adds functionalized chain ends to the polymer.

38. The process of claim 1, wherein activation of group B is accomplished by addition of a base.

39. The process of claim 38, wherein the base is selected from the group consisting of hydroxide, amine, and carbanion.

40. The process of claim 38, wherein the base is butyl lithium.

41. The process of claim 1, wherein the activation of group B is accomplished by the addition of bifluoride or bibenzoate anion.

42. The process claim 1, wherein the AB monomer is selected from the group consisting of 1-(2-vinyloxyethyloxy)-1'-[2-(1-acetoxyethoxy)-ethyloxy]-4,4'-isopropylidenediphenol; 1-vinyloxymethyl-4-(1-acetoxy) ethyloxymethylcyclohexane; 4-(2-vinyloxyethyl)-4-[1-acetoxyethyloxy)ethyl]terephthalate; 2-(2-vinyloxyethyl)-2-[(1-acetoxyethyloxy)ethyl]diethyl malonate; 1-(2-vinyloxyethyl)-3-[(1-acetoxyethyloxy)ethyl]-5-(2-methacryloyoxyethyl)-1,3,5-benzene tricarboxylate; 1-[(4-ethenyl)-phenoxymethyl]-4-[4-(1-chloroethyl) phenoxymethyl]benzene; 4-(2-(1-chloroethyloxy)) ethyloxystyrene; 4-(1-bromoethyl)styrene; 4-(1-chloroethyl)styrene, 3-chloromethylstyrene, 4-chloromethylstyrene, a mixture of 3-chloromethylstyrene and 4-chloromethylstyrene, 3-(1-bromoethyl)styrene, and 3-(1-chloroethyl)styrene.

43. The process of claim 1 wherein the C monomer is selected from the group consisting of isobutyl vinyl ether, 2-methoxyethyl vinyl ether, 2-ethoxyethyl vinyl ether, 2-butoxyethyl vinyl ether, ethyl vinyl ether, methy vinyl ether, butyl vinyl ether, cyclohexylmethyl vinyl ether, [4-(methoxymethyl)cyclohexyl]methyl vinyl ether, 2-(trimethylsilyloxy)ethyl vinyl ether, 2-(t-butyldimethylstlyloxy)ethyl vinyl ether, t-amyl vinyl ether, 4-(t-butyldimethylsilyloxy)cyclohexyl vinyl ether, ethyleneglycol butyl vinyl ether, triethyleneglycol methyl vinyl ether, 2-ethylhexyl vinyl ether, cylohexylvinyl ether, 4-(trimethylsilyloxy)butyl vinyl ether, [4-(trimethylsilyloxymethyl)cyclohexyl]methyl vinyl ether, 4-methoxystyrene, 4-methylstyrene], vinyltoluene, ethylstyrene butyl styrene, isopropyl styrene, 2,4,6-trimethylstyrene, 4-acetoxystyrene, 4-t-butyldimethylsilyloxystyrene, 4-trimethylsilyloxystyrene, 4-(2-methoxyethoxy)styrene, methyl methacrylate, ethyl methacrylate, butyl methacrylate, phenyl methacrylate, methyl acrylate, ethyl acrylate, butyl acrylate, phenyl acrylate, N,N-dimethyl methacrylamide, N,N-dimethylacrylamide, N-vinylcarbazole.

44. The process of claim 1, wherein an A—A monomer is added prior to the completion of polymerization.

45. The process of claim 44, wherein the A—A monomer is selected from the group consisting of divinyl ether, 1,1'-bis-(2-vinyloxyethoxy)-4,4-isopropylidene diphenol, diethyleneglycol divinylether, butanediol divinyl ether, cylohexanedimethanol divinylether, hexanediol divinyl ether, cyclohexanediol divinyl ether, poly(THF) divinyl ether, polyethyleneglycol divinyl ether, ethylene glycol divinyl ether, triethyleneglycol divinyl ether, tetraethyleneglycol divinyl ether, divinylbenzene, bis-(4-ethenylphenyl) methane, bis-1,2(4-ethenylphenyl)ethane, ethyleneglycol dimethacrylate, bis-1,2-(4-ethenylphenoxy)ethane, and bis-1,4-(4-ethenylphenoxy)butane.

46. The process of claim 44, wherein the A—A monomer is added in an amount such that precipitation of the polymer does not occur.

47. A hyperbranched polymer produced from the copolymerization reaction of an AB monomer and a C monomer in which A and B are reactive groups that react independently of each other and in which the group A is a polymerizable group, the C monomer contains a group that can be polymerized by A* or B*, the group B is a precursor of an activated moiety B* capable of effecting the polymerization of A and C as a result of being activated, wherein activated B adds to any A or C polymerizable group, and said hyperbranched polymer has living character in that said polymer has active sites A*, B* and C* that can add to any A or C polymerizable groups.

48. The polymer of claim 47 wherein the polymer has functionalized chain ends.

49. The polymer of claim 47, wherein the AB monomer is selected from the group consisting of 1-(2-vinyloxyethyloxy)-1'-[2-(1-acetoxyethoxy)-ethyloxy]-4,4-isopropylidenediphenol; 1-vinyloxymethyl-4-(1-acetoxy) ethyloxymethylcyclohexane; 4-(2-vinyloxyethyl)-4'-[1-acetoxyethyloxy)ethyl]terephthalate; 2-(2-vinyloxyethyl)-2-[(1-acetoxyethyloxy)ethyl]diethyl malonate; 1-(2-vinyloxyethyl)-3-[(1-acetoxyethyloxy)ethyl]-5-(2-methacryloy loxyethyl)-1,3,5-benzene tricarboxylate; 1-[(4-ethenyl)-phenoxy methyl]-4-[4-(1-chloroethyl) phenoxymethyl]benzene; 4-(2-(1-chloroethyloxy)) ethyloxystyrene; 4-(1-bromoethyl)styrene; 4-(1-chloroethyl)styrene, 3-chloromethylstyrene, 4-chloromethylstyrene, a mixture of 3-chloromethylstyrene and 4-chloromethylstyrene, 3-(1-bromoethyl)-styrene, and 3-(1-chloroethyl)styrene.

50. The polymer of claim 47 wherein the C monomer is selected from the group consisting of isobutyl vinyl ether, 2-methoxyethyl vinyl ether, 2-ethoxyethyl vinyl ether, 2-butoxyethyl vinyl ether, ethyl vinyl ether, methyl vinyl ether, butyl vinyl ether, cyclohexylmethyl vinyl ether, [4-(methoxymethyl)cyclohexyl]methyl vinyl ether, 2-(trimethylsilyloxy) ethyl vinyl ether, 2-(t-butyldimethylsilyloxy)ethyl vinyl ether, t-amyl vinyl ether, 4-(t-butyldimethylsilyloxy)cyclohexyl vinyl ether, ethyleneglycol butyl vinyl ether, triethyleneglycol methyl vinyl ether, 2-ethylhexyl vinyl ether, cyclohexylvinyl ether, 4-(trimethylsilyloxy)butyl vinyl ether, [4-(trimethylsilyloxymethyl)cyclohexyl]methyl vinyl ether, 4-methoxystyrene, 4-methylstyrene, vinyltoluene, ethylstyrene butyl styrene, isopropyl styrene, 2,4,6-trimethylstyrene, 4-acetoxystyrene, 4-t-butyldimethylsilyloxystyrene, 4-trimethylsilyloxystyrene, 4-(2-methoxyethoxy)styrene, methyl methacrylate ethyl methacrylate, butyl methacrylate, phenyl methacrylate, methyl acrylate, ethyl acrylate, butyl acrylate, phenyl acrylate, N,N-dimethyl methacrylamide, and N,N-dimethylacrylamide N-vinylcarbazole.

51. The polymer of claim 47, wherein the polymer has a degree of branching of from about 0.05–0.95.

52. The polymer of claim 47, wherein the polymer has a degree of branching of greater than about 0.2.

53. The polymer of claim 47, wherein the polymer has a degree of branching of greater than about 0.3.

54. The polymer of claim 47, wherein the polymer has a degree of branching of greater than about 0.5.

55. The polymer of claim 47, wherein the active sites A*, B*, and C* are capable of reaction with nucleophiles.

56. The polymer of claim 47, wherein the active sites A*, B*, and C* are capable of reaction with electrophiles.

* * * * *

UNITED STATES PATENT AND TRADEMARK OFFICE
CERTIFICATE OF CORRECTION

PATENT NO. : 5,663,260
DATED : September 2, 1997
INVENTOR(S) : Frechet, et al

It is certified that error appears in the above-identified patent and that said Letters Patent is hereby corrected as shown below:

In the Claims:

Claim 2, Col. 27, line 18: Delete "and C" and insert --and C*--

Claim 16, Col. 30, line 15: Delete "$(R^{16})$" and insert --$(R^{16})_3$; --

Claim 20, Col. 30, line 65: Delete "$A^2(S_x^1)B^2$" and insert --$A^2(S^1{}_x)_pB^2$--

Claim 22, Col. 33, line 47: Delete "Si" and insert --$OSi(CH_3)_3$--

Claim 43, Col. 35, line 43: Delete "methy" and insert --methyl--

Claim 43, Col. 35, line 47: Delete "butyldimethylstlyloxy)ethyl" and insert --butyldimethylsilyloxy)ethyl--

Claim 43, Col. 35, line 50: Delete "cylohexyvinyl" and insert --cyclohexylvinyl--

Signed and Sealed this

Third Day of February, 1998

BRUCE LEHMAN

Attest:

Attesting Officer

Commissioner of Patents and Trademarks